US009794801B1

(12) United States Patent
Ram et al.

(10) Patent No.: US 9,794,801 B1
(45) Date of Patent: Oct. 17, 2017

(54) MULTICAST AND UNICAST MESSAGES IN A VIRTUAL CELL COMMUNICATION SYSTEM

(75) Inventors: Mohan Ram, Banashankari (IN); Vaduvur Bharghavan, Morgan Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 908 days.

(21) Appl. No.: 13/032,302

(22) Filed: Feb. 22, 2011

Related U.S. Application Data (63) Continuation-in-part of application No. 11/715,287, filed on Mar. 7, 2007, now Pat. No. 7,826,426, which
(Continued)

(51) Int. Cl.
H04L 12/28 (2006.01)
H04W 24/02 (2009.01)
(Continued)

(52) U.S. Cl.
CPC ............ *H04W 24/02* (2013.01); *H04L 12/56* (2013.01); *H04W 4/06* (2013.01); *H04W 24/10* (2013.01); *H04W 36/08* (2013.01)

(58) Field of Classification Search
CPC ......... H04L 12/56; H04L 45/16; H04L 12/18; H04W 80/04; H04W 4/06; H04J 3/02; H04H 20/71
(Continued)

(56) References Cited

U.S. PATENT DOCUMENTS

| | | | |
|---|---|---|---|
| 3,956,749 | A | 5/1976 | Magorian |
| 5,038,151 | A | 8/1991 | Kaminski |

(Continued)

FOREIGN PATENT DOCUMENTS

| | | |
|---|---|---|
| JP | 2005311580 | 11/2005 |
| JP | 2006229972 | 8/2006 |

OTHER PUBLICATIONS

Amir. "Fast handoff for seamless wireless mesh networks." MobiSys '06, Jun. 19-22, 2006, pp. 83-95, ACM, Uppsala, Sweden.
(Continued)

*Primary Examiner* — Ricky Ngo
*Assistant Examiner* — Lan Huong Truong
(74) *Attorney, Agent, or Firm* — Law Office of Dorian Cartwright; Dorian Cartwright (57) ABSTRACT

Reliable multicast delivery in wireless communication, even when a WS doesn't know its AP, is determined at the AP without the sending device. Multicast packets are received at each AP having destinations. Without altering those packets, the AP encapsulates them in an A-MSDU packet. Each A-MSDU packet is sent individually to each destination, and might encapsulate more than one multicast packet. Destinations might receive two streaming messages faster than if sent separately. AP's might choose a 1st multiple of multicast packets from a 1st source, a 2nd, different, multiple of multicast packets from a 2nd source, and a single multicast packet from a 3rd source. Individualized optimization of transmission parameters for each A-MSDU packet and each multicast packet therein. Individualized optimization of transmission parameters for the A-MSDU packet for each destination. The AP collectively optimizes delivery of distinct multicast packets to different destinations.

10 Claims, 1 Drawing Sheet

Related U.S. Application Data is a continuation of application No. 11/298,864, filed on Dec. 9, 2005, now abandoned, which is a continuation-in-part of application No. 11/294,673, filed on Dec. 5, 2005, now Pat. No. 8,160,664, application No. 13/032,302, which is a continuation-in-part of application No. 11/396,400, filed on Mar. 31, 2006, now Pat. No. 8,064,601, and a continuation-in-part of application No. 12/035,925, filed on Feb. 22, 2008.

(60) Provisional application No. 61/308,839, filed on Feb. 26, 2010.

(51) Int. Cl.
*H04L 12/54* (2013.01)
*H04W 4/06* (2009.01)
*H04W 36/08* (2009.01)
*H04W 24/10* (2009.01)

(58) Field of Classification Search
USPC .................................................. 370/420, 312
See application file for complete search history.

(56) References Cited

U.S. PATENT DOCUMENTS

| | | | |
|---|---|---|---|
| 5,125,108 A | 6/1992 | Talwar | |
| 5,177,788 A | 1/1993 | Schanning et al. | |
| 5,337,397 A | 8/1994 | Lebby et al. | |
| 5,519,706 A | 5/1996 | Bantz et al. | |
| 5,884,272 A | 3/1999 | Walker et al. | |
| 5,966,094 A | 10/1999 | Ward et al. | |
| 6,023,621 A | 2/2000 | Jackson et al. | |
| 6,658,047 B1 | 12/2003 | Komulainen et al. | |
| 6,721,334 B1* | 4/2004 | Ketcham | 370/473 |
| 6,728,603 B2 | 4/2004 | Pruzan et al. | |
| 6,760,318 B1 | 7/2004 | Bims | |
| 6,788,658 B1 | 9/2004 | Bims | |
| 6,839,038 B2 | 1/2005 | Weinstein | |
| 6,877,043 B2 | 4/2005 | Mallory et al. | |
| 6,894,649 B2 | 5/2005 | Ostervall | |
| 6,933,909 B2 | 8/2005 | Theobold | |
| 6,954,177 B2 | 10/2005 | Channabasappa et al. | |
| 6,978,158 B2 | 12/2005 | Ghavami | |
| 6,999,802 B2 | 2/2006 | Kim | |
| 7,057,566 B2 | 6/2006 | Theobold | |
| 7,171,215 B2 | 1/2007 | Khouaja et al. | |
| 7,194,008 B2 | 3/2007 | Chu et al. | |
| 7,197,308 B2 | 3/2007 | Singhal et al. | |
| 7,277,728 B1 | 10/2007 | Kauhanen | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,400,604 B2 | 7/2008 | Lee et al. | |
| 7,403,506 B2 | 7/2008 | Lee et al. | |
| 7,406,319 B2 | 7/2008 | Kostic et al. | |
| 7,420,942 B2 | 9/2008 | Wang | |
| 7,426,388 B1 | 9/2008 | Wright et al. | |
| 7,430,397 B2 | 9/2008 | Suda et al. | |
| 7,433,722 B2 | 10/2008 | Sakamoto et al. | |
| 7,444,425 B2* | 10/2008 | Lehmann et al. | 709/238 |
| 7,466,981 B1 | 12/2008 | Abdelhamid et al. | |
| 7,499,673 B2 | 3/2009 | Saliga et al. | |
| 7,515,909 B2 | 4/2009 | Jain et al. | |
| 7,555,287 B1 | 6/2009 | Heinonen et al. | |
| 7,630,402 B2 | 12/2009 | Un et al. | |
| 7,630,403 B2* | 12/2009 | Ho | H04L 1/1621 370/389 |
| 7,693,513 B2 | 4/2010 | Chou | |
| 7,826,426 B1 | 11/2010 | Bharghavan et al. | |
| 7,843,910 B2 | 11/2010 | Loughran et al. | |
| 7,881,271 B2* | 2/2011 | Oishi | H04L 1/1614 370/338 |
| 7,904,777 B2* | 3/2011 | Singh et al. | 714/749 |
| 8,027,637 B1 | 9/2011 | Bims | |
| 8,090,374 B2 | 1/2012 | Rezvani et al. | |
| 8,121,057 B1* | 2/2012 | Botha | H04L 12/1827 370/270 |
| 8,464,138 B2* | 6/2013 | Abraham et al. | 714/776 |
| 8,472,359 B2 | 6/2013 | Bharghavan et al. | |
| 8,787,309 B1 | 7/2014 | Bharghavan et al. | |
| 2002/0022483 A1 | 2/2002 | Thompson et al. | |
| 2002/0060995 A1 | 5/2002 | Cervello et al. | |
| 2002/0086640 A1 | 7/2002 | Belcher et al. | |
| 2002/0091846 A1* | 7/2002 | Garcia-Luna-Aceves | H04L 12/18 709/230 |
| 2002/0112008 A1 | 8/2002 | Christenson et al. | |
| 2002/0147031 A1 | 10/2002 | Hood | |
| 2002/0181629 A1 | 12/2002 | Shibata | |
| 2003/0162546 A1 | 8/2003 | Jordan | |
| 2003/0198305 A1 | 10/2003 | Taylor et al. | |
| 2003/0199247 A1 | 10/2003 | Striemer | |
| 2003/0206532 A1 | 11/2003 | Shpak | |
| 2003/0206535 A1 | 11/2003 | Shpak | |
| 2003/0207697 A1 | 11/2003 | Shpak | |
| 2003/0207698 A1 | 11/2003 | Shpak | |
| 2003/0207699 A1 | 11/2003 | Shpak | |
| 2003/0236103 A1 | 12/2003 | Tamaki et al. | |
| 2004/0051668 A1 | 3/2004 | Chang | |
| 2004/0063455 A1 | 4/2004 | Eran et al. | |
| 2004/0121770 A1 | 6/2004 | Tigerstedt et al. | |
| 2004/0141617 A1 | 7/2004 | Volpano | |
| 2004/0156399 A1 | 8/2004 | Eran | |
| 2004/0183726 A1 | 9/2004 | Theobold | |
| 2004/0185904 A1 | 9/2004 | Yamakita | |
| 2004/0235453 A1 | 11/2004 | Chen et al. | |
| 2005/0041688 A1* | 2/2005 | Bernhard | H04L 29/06 370/473 |
| 2005/0054370 A1 | 3/2005 | Shpak | |
| 2005/0111405 A1 | 5/2005 | Kanterakis | |
| 2005/0122919 A1 | 6/2005 | Touag | |
| 2005/0135321 A1 | 6/2005 | Sharony | |
| 2005/0152314 A1 | 7/2005 | Sun et al. | |
| 2005/0153713 A1 | 7/2005 | Sharony | |
| 2005/0156794 A1 | 7/2005 | Theobold et al. | |
| 2005/0156799 A1 | 7/2005 | Theobold | |
| 2005/0195110 A1 | 9/2005 | Lin et al. | |
| 2005/0219143 A1 | 10/2005 | Schadler et al. | |
| 2005/0220048 A1 | 10/2005 | Lee et al. | |
| 2005/0238054 A1* | 10/2005 | Sharma | 370/473 |
| 2005/0261970 A1 | 11/2005 | Vucina et al. | |
| 2006/0002331 A1 | 1/2006 | Bhagwat et al. | |
| 2006/0025127 A1 | 2/2006 | Cromer et al. | |
| 2006/0049987 A1 | 3/2006 | Herrick | |
| 2006/0056443 A1* | 3/2006 | Tao et al. | 370/462 |
| 2006/0098613 A1* | 5/2006 | Kish | H04N 21/6405 370/338 |
| 2006/0111112 A1 | 5/2006 | Maveddat | |
| 2006/0120339 A1* | 6/2006 | Akiyama | H04L 1/1678 370/338 |
| 2006/0132360 A1 | 6/2006 | Caimi et al. | |
| 2006/0159092 A1* | 7/2006 | Boers | H04L 45/00 370/390 |
| 2006/0203819 A1* | 9/2006 | Farinacci et al. | 370/390 |
| 2006/0215691 A1 | 9/2006 | Kobayashi et al. | |
| 2006/0221993 A1 | 10/2006 | Liao et al. | |
| 2006/0281500 A1 | 12/2006 | Huang et al. | |
| 2007/0014267 A1 | 1/2007 | Lam et al. | |
| 2007/0026807 A1 | 2/2007 | Kish | |
| 2007/0117514 A1 | 5/2007 | Gainey et al. | |
| 2007/0165610 A1 | 7/2007 | Tseng et al. | |
| 2007/0195725 A1 | 8/2007 | Iino et al. | |
| 2007/0201468 A1* | 8/2007 | Jokela | H04L 12/18 370/390 |
| 2007/0213071 A1 | 9/2007 | Hwang | |
| 2008/0014956 A1 | 1/2008 | Balasubramanian | |
| 2008/0102835 A1 | 5/2008 | Zhao et al. | |
| 2008/0112373 A1 | 5/2008 | Shpak | |
| 2008/0153497 A1 | 6/2008 | Kalhan | |
| 2008/0165866 A1 | 7/2008 | Teo et al. | |
| 2008/0167093 A1 | 7/2008 | Nagano et al. | |
| 2008/0212535 A1 | 9/2008 | Karaoguz et al. | |
| 2008/0242305 A1 | 10/2008 | Kahlert et al. | |

(56) References Cited

U.S. PATENT DOCUMENTS

| | | | |
|---|---|---|---|
| 2008/0287130 | A1 | 11/2008 | Laroia et al. |
| 2009/0022127 | A1 | 1/2009 | Traynor et al. |
| 2009/0023434 | A1 | 1/2009 | Trainor et al. |
| 2009/0061873 | A1 | 3/2009 | Bao et al. |
| 2009/0061879 | A9 | 3/2009 | Gallagher et al. |
| 2009/0111472 | A1 | 4/2009 | Promenzio |
| 2009/0252165 | A1 | 10/2009 | Zhang et al. |
| 2010/0080151 | A1 | 4/2010 | Proctor et al. |
| 2011/0040969 | A1 | 2/2011 | Yao et al. |
| 2011/0188484 | A1 | 8/2011 | Reznik et al. |
| 2011/0305217 | A1 | 12/2011 | Seok |
| 2012/0307792 | A1 | 12/2012 | Ram et al. |
| 2012/0314696 | A1 | 12/2012 | Liu |
| 2012/0317619 | A1 | 12/2012 | Dattagupta et al. |
| 2013/0148609 | A1 | 6/2013 | Ram et al. |
| 2013/0188539 | A1 | 7/2013 | Han et al. |
| 2014/0112322 | A1 | 4/2014 | Ram et al. |
| 2014/0126466 | A1 | 5/2014 | Hamdi et al. |

OTHER PUBLICATIONS

Chen et al. "A seamless handoff mechanism for DHCP-Based IEEE 802.11 WLANs." IEEE Communications Letters, Aug. 2007, pp. 665-667, vol. 1, No. 8.

Cheung et al. "Network configurations for seamless support of CDMA soft handoffs between cell clusters." IEEE Journal on Selected Areas in Communications, Sep. 1997, pp. 1276-1288, vol. 15, No. 7.

Chui et al. "An Access point coordination system for improved VoIP/WLAN handover performance." IEEE 2006, pp. 501-505.

Fan et al. "Managing heterogeneous access networks." 32nd IEEE Conference on Local Computer Networks, IEEE 2007, pp. 651-658.

Habib et al. "Multi-antenna techniques for OFDM based WLAN." Proceedings of First International Conference on Next-Generation Wireless Systems, Jan. 2006, pp. 186-190.

Huang et al. "Incorporating AP selection and call admission control for seamless handoff procedure." Proceedings of the International Conference on Computer and Communication Engineering 2008, 2008, pp. 823-826.

Huang et al. "SAP: Seamless authentication protocol for vertical handoff in heterogeneous wireless networks." Third International Conference on Quality of Service in Heterogeneous Wired/Wireless Networks, Aug. 7-9, 2006, Waterloo, ON, Canada, pp. 1-10. ACM.

Kist. "Instant handoffs for wireless infrastructure meshed networks," Proceedings of the 2008 Australasian Telecommunication Networks and Applications Conference, 2008, pp. 288-293.

Kitahara et al. "A base station adaptive antenna for downlink transmission in a DS-CDMA system." IEEE 51st Vehicular Technology Conference Proceedings, 2000 (abstract).

Liao et al. "Practical schemes for smooth MAC layer handoff in 802.11 wireless networks." Proceedings of the 2006 International Symposium on a World of Wireless, Mobile and Multimedia Networks, IEEE, pp. 1-10.

LV. "Intelligent seamless vertical handoff algorithm for the next generation wireless networks." Mobilware '08, Feb. 12-15, 2008, Innsbruck, Austria, pp. 1-10.

Mahler et al. "Design and optimisation of an antenna array for WiMAX base stations." IEEE/ACES International Conference on Wireless Communications and Applied Computational Electromagnetics, 2005 (abstract).

Manodham et al. "A Seamless handoff scheme with new AP module for wireless LANs support VoIP." Proceedings of the 2005 Symposium on Applications and the Internet. IEEE, 2006, pp. 1-6.

Miaris et al. "On the base stations antenna system design for mobile communications." Electrical Engineering, 2006, vol. 88, pp. 157-163.

Miura et al. "Study of array pattern tuning method using hybrid genetic algorithms for figure-8 satellite's earth station antenna." Asia-Pacific Microwave Conference Proceedings, 2000 (abstract).

Murray et al. "Intelligent access and mobility management in heterogeneous wireless networks using policy." First International Workshop on Information and Communication Technologies, ACM, 2003, pp. 181-186.

Ponnapalli et al. "Design and packaging of antennas for wireless systems." Proceedings of Electrical Performance of Electrical Packaging, 1995 (abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (abstract).

Yaakob et al. "An integration of mobile motion prediction with dedicated solicitation message for seamless handoff provisioning in high speed wireless environment." 2008 International Conference on Electronic Design, Dec. 1-3, 2008, Pernang, Malaysia, pp. 1-5.

Wei et al. "Seamless handoff support in wireless mesh networks." IEEE 2006, pp. 1-8.

Zhou et al. "A seamless handoff scheme for Mobile IP." IEEE Vehicular Technology Conference, 2006, vol. 2, pp. 927-931.

Business Wire. "Meru Networks Delivers Industry's Only Zero-Loss Mobility Across WLAN Access Points and IP Subnets." Jun. 21, 2004, pp. 1-2.

Chen et al. "A Seamless Handoff Mechanism for OHCP-Based IEEE 802.11 WLANs." IEEE Communications Letters, Aug. 2007, pp. 665-667, vol. 1, No. 8.

Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.

Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).

Chui et al. "An Access Point Coordination System for Improved VoIP/WLAN Handover Performance." IEEE, 2006, pp. 501-505.

Fan et al. "Managing Heterogeneous Access Networks." 32nd IEEE Conference on Local Computer Networks, 2007, pp. 651-658, IEEE 2007, pp. 651-658.

Finneran. "Can WLAN switches support voice? Today's controllers offer key security and QoS capabilities, but as always, the devil's in the details." Business Communications Review, Oct. 2006, pp. 42-47.

Huang et al. "Incorporating AP Selection and Call Admission Control for Seamless Handoff Procedure." Proceedings of the International Conference on Computer and Communication Engineering 2008, pp. 823-826.

Huang et al. "SAP: Seamless Authentication Protocol for Vertical Handoff in Heterogeneous Wireless Networks." Third International Conference in Heterogeneous Wired/Wireless Networks, Aug. 7-9, 2006, pp. 1-10, Waterloo, ON, CA.

Hur et al. "A Distributed-Request-Based Diffserv CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.

IEEE Std 802. 11-1997 Information Technology—telecommunications and Information exchange between systems—Local and Metropolitan Area Networks—specific Requirements—part 11: Wireless LAN Medium Access Control (MAC) and Physical Layer (PHY) Specifications, IEEE Std 802.11-1997, vol., No., pp. i-445, Nov. 18, 1997.

IEEE. "Part 11: Wireless LAN Medium Access Control (MAC) and Physical Layer (PHY) specifications." IEEE Std. 802.11, 1999 Edition (R2003), 2003, vol. No. pp. i-513.

Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).

Zhou et al. "A Seamless Handoff Scheme for Mobile IP." 2006 IEEE 63rd Vehicular Technology Conference, VTC 2006-Spring, May 7-Jul. 10, 2006, pp. 927-931, IEEE. (Abstract).

Kist. "Instant Handoffs for Wireless Infrastructure Meshed Networks." Proceedings of the 2008 Australasian Telecommunication Networks and Applications Conference, 2008, pp. 288-293.

(56) References Cited

OTHER PUBLICATIONS

Kitahara et al. "A base station adaptive antenna for downlink transmission in a OS-COMA system." IEEE 51st Vehicular Technology Conference Proceedings, 2000 (abstract).

Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.

Lv. "Intelligent Seamless Vertical Handoff Algorithm for the Next Generation Wireless Networks." Mobilware '08, Feb. 12-15, 2008, pp. 1-10, Innsbruck, Austria.

Mannion. "Foundry Networks enters WLAN management fray—Bets on integration with wired infrastructure, market timing to take on Cisco." Electronic Engineering Times, Sep. 8, 2003, p. 32, No. 1286.

Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract).

Manodham et al. "A Seamless Handoff Scheme with New AP Module for Wireless LANs support VoIP." Proceedings of the 2005 Symposium on Applications and the Internet, 2006, pp. 1-6, IEEE.

Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.

Murray et al. "Intelligent Access and Mobility Management in Heterogeneous Wireless Networks Using Policy." ACM First International Workshop on Information and Communication Technologies, 2003, pp. 181-186.

Rist et al. "Wireless LANs—Look, Ma . . . No Wires—Wireless networking products prove they are finally ready for prime time." Internetweek, Mar. 20, 2000, p. 41, No. 805, CMP Media, Inc.

Sarolic. "Base station antenna near-field radiation pattern distortion analysis." Transactions on Engineering Sciences, 2003, pp. 1-10, vol. 41, WIT Press.

Sattari et al. "Seamless Handover Between WLAN and UMTS." 2004 IEEE 59th Vehicular Technology Conference, VTC2004—Spring: Towards a Global Wireless World, May 17-19, 2004, pp. 3035-3038, IEEE. (Abstract).

Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).

Wei et al. "Seamless Handoff Support in Wireless Mesh Networks." 2006, pp. 1-8, IEEE.

Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).

Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).

Zhou et al. "A Seamless Handoff Scheme for Mobile IP." IEEE Vehicular Technology Conference, 2006, pp. 927-931, vol. 2.

\* cited by examiner

MULTICAST AND UNICAST MESSAGES IN A VIRTUAL CELL COMMUNICATION SYSTEM

INCORPORATED DISCLOSURES

This application claims priority of the following disclosures, hereby incorporated by reference as if fully set forth herein:

U.S. Provisional Patent Application 61/308,839, filed Feb. 26, 2010, in the name of Mohan RAM and Saravanan BALASUBRAMANIAN, titled "Multicast and Unicast Messages in a Virtual Cell Communication System", assigned to the same assignee, U.S. patent application Ser. No. 11/715,287, filed Mar. 7, 2007, in the name of Vaduvur BHARGHAVAN, Sung-Wook HAN, Joseph EPSTEIN, Berend DUNSBERGEN, and Saravanan BALASUBRAMANIAN, titled "Seamless Mobility in Wireless Networks", assigned to the same assignee, which itself claims the priority of, and hereby incorporates by reference as if fully set forth herein, the following: U.S. patent application Ser. No. 11/298,864, filed Dec. 9, 2005, in the name of Vaduvur BHARGHAVAN, Sung-Wook HAN, Joseph EPSTEIN, Berend DUNSBERGEN, and Saravanan BALASUBRAMANIAN, titled "Seamless Mobility in Wireless Networks", and assigned to the same assignee, which itself claims the priority of, and hereby incorporates by reference as if fully set forth herein, the following: U.S. patent application Ser. No. 11/294,673, filed Dec. 5, 2005, in the name of Rajendran VENUGOPALACHARY, Senthil PALANISAMY, Srinith SARANG, and Vaduvur BHARGHAVAN, titled "Omni-Directional Antenna Supporting Simultaneous Transmission and Reception of Multiple Radios with Narrow Frequency Separation", and assigned to the same assignee.

U.S. patent application Ser. No. 11/396,400, filed Mar. 31, 2006, in the name of inventors Senthil PALANISAMY, titled "Security in Wireless Communication Systems", and assigned to the same assignee.

U.S. patent application Ser. No. 12/035,925, filed Feb. 22, 2008, in the name of inventors Berend DUNSBERGEN and Anand Prakash POOMAGAME, titled "Associating mobile stations with virtual cells using key search". and assigned to the same assignee.

U.S. Provisional Patent Application Ser. No. 61/095,578, filed Sep. 9, 2008, in the name of inventors Vaduvur BHARGHAVAN and Berend DUNSBERGEN, titled "Seamless Roaming in Wireless Networks", and assigned to the same assignee.

This application claims priority of any and all disclosures whose priority is claimed by the foregoing, or which are incorporated by reference by the foregoing. These disclosures are sometimes referred to herein as the "Incorporated Disclosures".

BACKGROUND

In wireless communication systems, each mobile station might be coupled to a communication network by associating that mobile station with a particular AP (access point). In some IEEE wireless communication standards, wireless packets may be sent unicast (to a single destination) or multicast (to more than one destination). "Broadcast" packets are that special case of multicast packets where the designated "more than one destination" includes substantially all destinations in the wireless communication system.

In some IEEE wireless communication standards, such as the IEEE 802.11 family of communication protocols, multicast packets are not reliably delivered. In wireless communication systems following an IEEE 802.11 protocol, unicast packets must be responded to by the destination, with an acknowledgement (ACK) packet. A higher-level protocol is able to ensure reliable delivery by known techniques that are employed when a message is sent to, but no ACK packet is received from, the destination.

While this technique is generally adequate to assure delivery of unicast packets, many communication protocols, including the IEEE 802.11 family of communication protocols, do not require the destination to respond with an ACK packet when it receives a multicast packet. This could be due to concern that the sender would be flooded with ACK packets, or might be due to the nature of traffic using multicast packets. For example, multicast packets are often used to broadcast streaming audio, video, or audio-video, signals to a recipient audience. In some cases, such as election news, sports events, and the first episode of the "Victoria's Secret" modeling show, that audience may be numbered in millions.

While the loss of some fraction of packets for streaming audio-video (for example) is not necessarily crippling, it can have a noticeable effect for a user at the destination. Missing even 50 milliseconds of audio, for example, can be noticed by many human ears, with the effect that loss of even a small fraction of packets may make the streaming signal seem broken-up or jumpy.

SUMMARY OF THE DESCRIPTION

This description includes techniques, including methods, physical articles, and systems, which provide reliable multicast delivery in a wireless communication system. This has the effect that the sender can be assured that those multicast messages it sends are reliably received by substantially every destination, without having to accept the possibility of some fraction of those messages being lost without notice to the sender.

For example and without limitation, in a wireless communication system similar to those described in the Incorporated Disclosures (as described below), or employing similar principles, the description includes techniques, including methods, physical articles, and systems, which provide reliable multicast delivery even when a wireless station (WS) is not aware of which access point (AP) it is assigned to. This has the effect that reliable delivery of those messages can be determined at the AP, without generating unnecessary traffic between the AP and the sending device, and without possibly overwhelming the sending device with ACK messages.

For example and without limitation, multicast packets in a wireless communication system (such as, for example, streaming audio-video) might be received at each AP for which there are one or more destination stations assigned thereto. Without altering any of those multicast packets, the AP might encapsulate each of them as a subframe in an aggregated MAC service data unit (A-MSDU) packet. Each such A-MSDU packet might be sent individually to each individual recipient destination station. This has the effect that the AP can substantially guarantee delivery of substantially each such multicast packet to substantially every one of its designated destinations.

This description includes techniques, including methods, physical articles, and systems, which provide for more than one such multicast packet to be encapsulated, each as a separate subframe, within each such A-MSDU packet. Note that as each such A-MSDU packet is sent directly to its individual destination, the selection of which, and how many, multicast packets to include within each such A-MSDU packet might be made by the AP. For example and without limitation, if a destination station is concurrently receiving streaming messages from multiple sources, multicast packets from each, or at least more than one, of those sources, might be differently encapsulated for distinct destinations. This has the effect that a destination might receive two or more such streaming messages encapsulated in a single A-MSDU packet.

If those two or more such streaming messages are originally from distinct sources, the destination might thus receive those streaming messages superior to if those two or more such streaming messages were sent separately. If those two or more such streaming messages are originally from a single source, the destination might again thus receive those streaming messages superior to if those two or more such streaming messages were sent separately. The invention includes the possibility that an AP, when generating an A-MSDU packet for a particular individual destination, might choose a $1^{st}$ set of multiple multicast packets from a $1^{st}$ source, a $2^{nd}$ set of multiple multicast packets from a $2^{nd}$ source, where the multiple number in the $2^{nd}$ set differs from the $1^{st}$ set, and perhaps, a single multicast packet from a $3^{rd}$ source, any combination or conjunction thereof, or by some other technique.

This description includes techniques, including methods, physical articles, and systems, which provide individualized optimization of transmission parameters for substantially each such A-MSDU packet. Note that as each such A-MSDU packet is separately sent to its individual destination, the selection of transmission parameters for each multicast packet encapsulated in the A-MSDU packet might be chosen individually for substantially each such multicast packet, and the selection of transmission parameters for the entire A-MSDU packet might be chosen individually for substantially each such destination. The invention includes the possibility that some multicast packets are delivered, when encapsulated, more slowly than if they had been otherwise transmitted multicast, so that the AP might deliver other multicast packets, when encapsulated, more quickly than if they had been otherwise transmitted multicast. This has the effect that a multicast packet to a $1^{st}$ destination need not slow down the same multicast packet sent to a $2^{nd}$ destination. This also has the effect that a $1^{st}$ multicast packet might be sent slower than if multicast, so that the AP can collectively optimize delivery of both $1^{st}$ and $2^{nd}$ multicast packets, in different numbers, to different destinations.

REAL-WORLD NATURE

The invention includes techniques, including methods, physical articles, and systems, that receive real-world information dictated by real-world conditions (not mere inputs to a problem-solving technique). The techniques provided by the invention are transformative of the information received, at least in the sense that incoming data is reordered and allocated to particular times and priorities. This has the effect that a $1^{st}$ type of information (e.g., incoming message units) is transformed into a $2^{nd}$ type of information (e.g., relative priority of outgoing message units).

The invention includes techniques that are tied to a particular machine, at least in the sense that allocation of time and bandwidth is performed in a communication system. While this description is primarily directed to that portion of the invention in which an AP plays a prominent role, this description also shows that an AP alone (i.e., without appropriate instructions) would not necessarily be sufficient to perform methods, or comprise systems, within the scope and spirit of the invention.

DESCRIPTION

Generality of the Description

This application should be read in the most general possible form. This includes, without limitation, the following:

References to specific techniques include alternative and more general techniques, especially when discussing aspects of the invention, or how the invention might be made or used.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

The invention is not in any way limited to the specifics of any particular examples disclosed herein. Many other variations are possible which remain within the content, scope and spirit of the invention, and these variations would become clear to those skilled in the art after perusal of this application.

Definitions and Notations

The following definitions and notations are exemplary, and not intended to be limiting in any way:

When a computation or determination is said to be "at the AP", "at the access point", and the like, there is no particular requirement that a computing device included in, or substantially co-located with, the AP perform that computation or determination. The AP might have access, for example and without limitation, by a wire-line connection, to other computing resources which are able to supply an answer to the computation or determination.

The terms "destination", and the like, when used with respect to information or messages, generally refer to either an immediate next hop in a communication chain, or to an intended recipient of the information in the message.

The phrases "reliable multicast delivery", and the like, generally refer to delivery of multicast packets in such manner that (presuming that higher-level protocols make proper use of ACK packets) a sender can substantially guarantee that each and every multicast packet will be delivered to each and every designated destination.

The terms "send", and the like, when used with respect to information or messages, generally refer to constructing and uttering a message to another element in a communication system. In the context of the invention, when a message is received and "sent", there is no particular requirement that the original signal or exact original bits of the message be included in the new message that is "sent".

The terms "stream", "streaming", and the like, and the phrases "streaming (some type of) data", and the like, generally refer to a sequence of messages intended to be received and used to present a time-varying signal. For example and without limitation, such a time-varying signal might include audio-visual data for presentation as part of a movie or television show.

The terms "superior", and the like, and the phrases "superior to", and the like, when used with respect to messages sending or transmission, generally refer to any set of transmission parameters which are preferred. For example, a $1^{st}$ set of transmission parameters might be superior to a $2^{nd}$ such set, in any one or more the following cases: faster per-bit throughput, lower bit-error rate, lower power required.

The phrases "wireless communication system", and the like, generally refer to any communication system including computing devices, in which at least some portion of the communication (such as between access points and wireless stations) is performed using a wireless technique.

After reading this application, those skilled in the art would recognize that these definitions and notations would be applicable to techniques, methods, physical elements, and systems—not currently known, or not currently known to be applicable by the techniques described herein—including extensions thereof that would be inferred by those skilled in the art after reading this application, even if not obvious to those of ordinary skill in the art at the time of reading this application.

Figures and Text

Where described as shown in a FIGURE, an element might include:
- Other items shown in the FIGURE in addition to, or operating in combination or conjunction with, that particular element (or that particular element in combination or conjunction with other elements, whether shown or not shown in the FIGURE, and whether described or not described with respect to the FIGURE).
- Other items not shown in the FIGURE, but whose inclusion would be known to those skilled in the art, or which would be known after reasonable investigation, without further invention or undue experimentation.
- Subparts of that element, whether shown or not shown in the FIGURE, which might be convenient for operation of the element, but which are not necessarily required in the described context, or which might be necessary for operation of the element in the described context, but which are not necessary for description at a level understandable to those skilled in the art.

Figure 1:
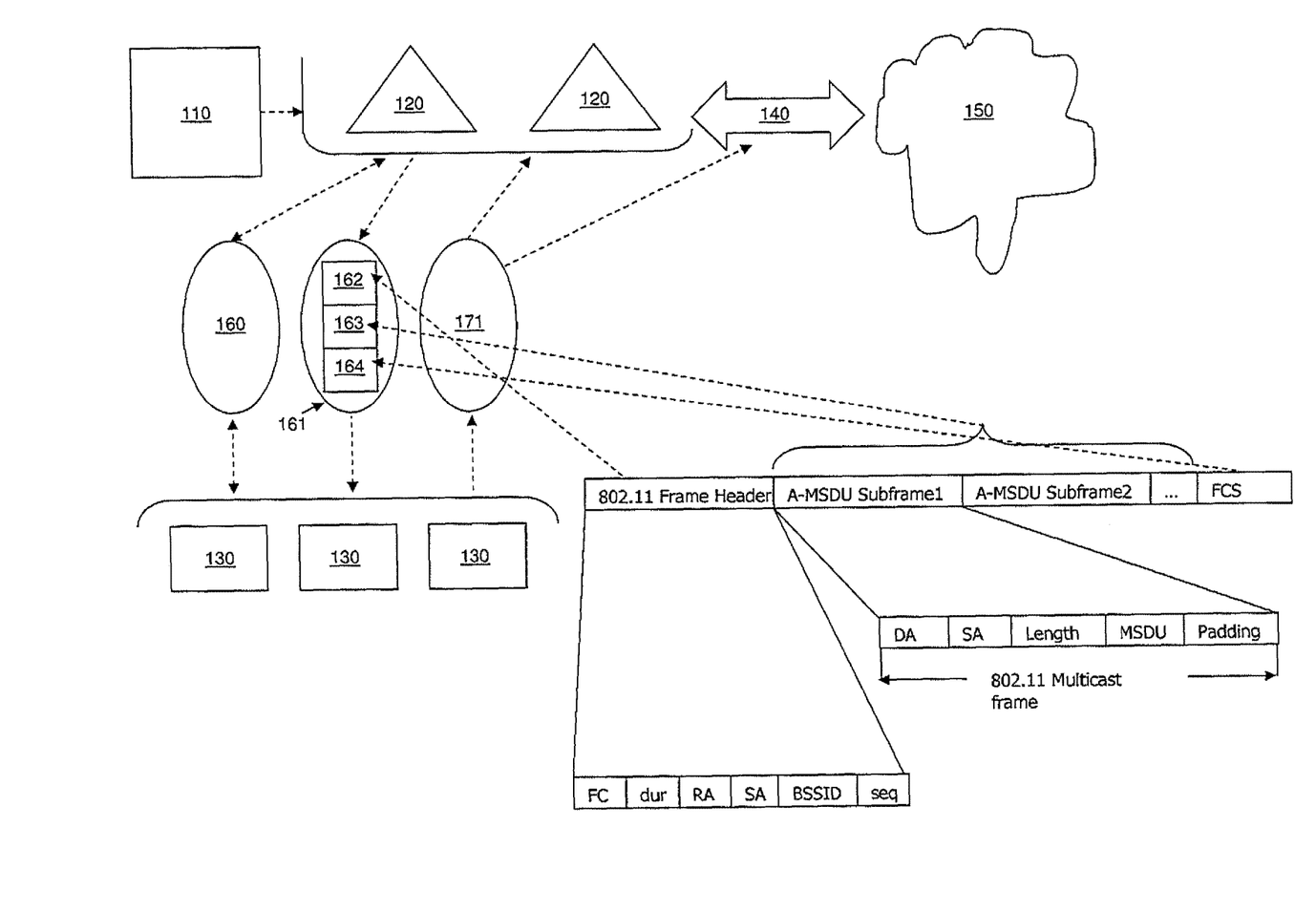
FIG. 1 shows a conceptual drawing of a wireless communication system.

FIG. 1

FIG. 1 shows a conceptual drawing of a wireless communication system.

A system 100 includes elements shown in the FIG. 1, including at least a control element 110, access points 120, wireless stations 130, and a communicating device 140 to an external network 150. These elements might cooperate in one or more of the ways described in the Incorporated Disclosures, or as in another operational wireless communication system.

Incorporated Methods

The control element 110 directs the access points 120 regarding which wireless stations 130 are assigned thereto. In general, IEEE standard 802.11 provides that each wireless station 130 should determine its best access point 120 to communicate with and should operate with the wireless communication system using that access point 120. In the FIG. 1, the control element 110 directs the access points 120 to respond (or not respond) to wireless stations 130 in compliance with a relevant standard; however, it directs the access points 120 to react in a way that causes the wireless station 130 (also in compliance with a relevant standard) to believe that its best access point 120 is the one assigned to it by the control element 110.

The Incorporated Disclosures describe at least two distinct ways by which this might be accomplished:

In a $1^{st}$ way, each access point 120 is supplied with the basic service set identifier (BSSID) of all authorized wireless stations 130; as a particular wireless station 130 moves about within the wireless communication system 100 (or if electromagnetic conditions change to prompt a similar change), the control element 110 determines, from time to time, which access point 120 is best for that particular wireless station 130, and directs the wireless communication system 100 to react as if that best access point 120 were the only one available to the wireless station 130.

In a $2^{nd}$ way, each access point 120 is supplied with the BSSID of only those authorized wireless stations 130 with which it might best communicate; as a particular wireless station 130 moves about within the wireless communication system 100 (or if electromagnetic conditions change to prompt a similar change), the control element 110 directs each particular access points 120 to add or remove such BSSID values from its memory, with the effect that the wireless communication system 100 should react as if the best particular access point 120 were the only one available to the wireless station 130.

In either case, each particular wireless station 130 is able to communicate with only the access point 120 to which it has been assigned by the control element 110. If a particular wireless station 130 desires to send a unicast message 160, that unicast message 160 is transmitted, received by its assigned access point 120, routed within the wireless communication system 100, possibly to the communicating device 140 toward a destination accessible using the external network 150. Similarly, if a unicast message 160 is directed to a particular wireless station 130, possibly from a sender accessible using the external network 150 to the communicating device 140, that unicast message 160 is routed within the wireless communication system 100 to the access point 120 assigned to that particular wireless station 130, which delivers that unicast message 160 to that particular wireless station 130.

One having skill in the art will appreciated that the control element 110 may be integrally formed as part of an access point 120 or be otherwise communicably coupled to an access point to effectuate the control element 110 functionality.

Receipt of Multicast Messages

If a particular wireless station 130 desires to send, or is one of the designated recipients of, a multicast message 160, that multicast message 160 first reaches an access point 120. That multicast message 160 would reach the access point 120 assigned to the sender, possibly the communicating device 140 if the sender is accessible using the external network 150.

When the multicast message 160 first reaches an access point 120, that access point 120 recognizes the message 160 as being multicast (as distinguished from unicast), and determines a set of designated destinations for that multicast message 160. Designated destinations might include one or more selected wireless stations 130, might include one or more destinations addressable using the external network 150, some combination or conjunction thereof, or otherwise.

While this description is primarily directed to cases in which the multicast message 160 explicitly designates all its recipients, in the context of the invention, there is no need for any such limitation. For example and without limitation, it might occur that a $1^{st}$ access point 120 reviews the multicast message 160, determines some number of destination wireless stations 130 assigned to it, and in addition, constructs and sends a revised multicast message 160 to a $2^{nd}$ access point for further processing.

In a case in which the wireless station 130 is a sender, the multicast message 160 reaches the access point 120 assigned to the wireless station. That access point 160 determines those destinations toward which the multicast message is directed.

The sending access point 120 constructs an A-MSDU packet 161, a type of message 160, including a packet header 162, packet body 163, and packet end-marker 164. The sending access point 120 constructs one such A-MSDU packet 161 for each destination it determines the multicast message 160 is directed toward. Note that an A-MSDU packet 161 is unicast to a particular wireless station 130, or possibly to the communicating device 140 if its destination is to be accessed using the external network 150. The packet header 162 of the A-MSDU packet 161 includes the MAC address of the particular destination, while the packet body 163 includes (a copy of) the original multicast message 160.

Construction of A-MSDU Packet

A-MSDU packets 161 provide for agglomerated transport of (copies of) multiple messages 160, so that multiple such messages 160 might be sent in a single message 160. The A-MSDU packet 161 including a (copy of) the multicast message 160 might also include (copies of) other multicast messages 160, and might include copies of other messages 160. For example and without limitation, an A-MSDU packet 161 might include copies of unicast messages 160 that the access point 120 has queued-up for sending.

In the case in which streaming audio-video data is sent to multiple destinations using multicast messages 160, it might occur that several of such multicast messages 160, each marked with its transmission order, are all (eventually, but hopefully sooner rather than later) sent to the destination. The access point 120 that constructs the A-MSDU packet 161 might choose to include multiple such multicast messages 160, with the effect that multiple such multicast messages 160 are combined into a single transport packet.

In the case in which streaming audio-video data, or other data, is sent from multiple senders to a single destination (for example and without limitation, when a television channel includes a picture-within-picture or split-screen feature), it might occur that several of such multicast messages 160, each marked with the MAC address of its sender, are all sent to the destination. The access point 120 that constructs the A-MSDU packet 161 might choose to include multiple such multicast messages 160, with the effect that multicast messages 160 from disparate senders are combined into a single transport packet.

There is no particular requirement that the access point 120 balance the number of multicast messages 160 it encapsulates (copies of) within the packet body 163 of the A-MSDU packet 161. A $1^{st}$ such A-MSDU packet 161 might include only one such multicast message 160; a $2^{nd}$ such A-MSDU packet 161 might include two or more multicast messages 160 from the same sender; a $3^{rd}$ such A-MSDU packet 161 might include single or multiple ones of multicast messages 160 from more than one sender, and might also include any "stray" unicast messages 160 the access point 120 happens to have available when constructing some particular A-MSDU packet 161.

Reliable Delivery of A-MSDU Packet

When each particular device for which the multicast message 160 was designated (for example and without limitation, each particular wireless station 130 or the communicating device 140) receives the A-MSDU packet 161, that A-MSDU packet 161 includes the specific MAC address for that particular wireless station 130. The destination wireless station 130 (hopefully) receives the A-MSDU packet 161 and responds with an ACK packet 171, another type of message 160. When the access point 120 associated with that destination wireless station 130 receives the ACK packet 171, it can reliably assure the sender of the multicast message 160 of receipt by that particular destination wireless station 130.

In the event that one or more of these ACK packets 171 is lost, stolen, or otherwise unaccounted for, the access point 120 might retry sending the A-MSDU packet 161 to those destination wireless stations 130 for which no ACK packet 171 was received. Acknowledgement and retry, together with backoff are techniques known in the art of computer communication to assure reliable delivery of messages 160 to destinations. The access point 120 might use acknowledgement and retry, or some other technique, to assure reliable delivery even if one or more such ACK packets 171 goes awry.

Reliable Acknowledgment of A-MSDU Packet

As noted above, the access point 120 waits for, and should receive, an ACK packet 171 for each individual destination, for each individual A-MSDU packet 161. Each particular ACK packet 171 has the effect of showing that its particular destination has received the A-MSDU packet 161, and by implication, that it has received each of the multicast messages 160 included in the packet body 130 of that A-MSDU packet 161. This has the effect that multicast messages 160 are reliably delivered, notwithstanding that the IEEE 802.11 standard provides for no such mechanism.

While this description is primarily directed to cases in which ACK packets 171 might be agglomerated into A-MSDU packets 161, in the context of the invention, there is no particular requirement for any such limitation. For example and without limitation, access points 120 and other routing elements on a communication pathway back from the destination access point 120 might receive such A-MSDU packets 161, parse them, and extract or insert other data in the packet data 163.

Such other data might include ACK packets 171 produced by distribution of other multicast messages 160, individualized ACK packets 171 produced by sending unicast messages 160, stray unicast messages 160 an intermediate access point 120 has ready for sending, other multicast messages 160 for delivery in a different communication direction, some combination or conjunction thereof, or otherwise.

Transmission Parameters

As noted above, a distributing access point 120 might choose to combine more than one multicast message 160 from the same source, or multicast messages 160 from more than one source, or some combination or conjunction thereof.

In the case that more than one multicast message 160 is encapsulated in a single A-MSDU packet 161, a particular access point 120 might be able to achieve superior communication with a particular wireless station 130, notwithstanding that multiple unicast messages 160 (the A-MSDU packets 171) are constructed in response to each such multicast message 160.

Other cases might also provide for superior communication between an access point 120 and its assigned wireless stations 130:

The access point 120 might alter the transmission parameters for the A-MSDU packet 161 to differ from the spawning multicast message 160. This might have the effect that multicast messages 160 distributed using the least generally-available communication paths could have superior communication for cases in which there is a subset of superior communication paths.

The access point 120 might alter the transmission parameters for the A-MSDU packet 161 when combining more than one multicast message 130 from the same source to a particular one destination into a single A-MSDU packet 161. This might have the effect that communication is superior to sending those more than one multicast messages 130 separately (even if they are multicast).

The access point 120 might alter the transmission parameters for the A-MSDU packet 161 when combining multicast messages 130 from more than one source to a particular one destination into a single A-MSDU packet 161. This might have the effect that communication is superior to sending those more than one multicast messages 130 separately.

The access point 120 might alter the transmission parameters for the A-MSDU packets 161, as they are constructed, in response to movement by wireless stations 130, reassignment of wireless stations 130 by the control element 110, changes in electromagnetic or other transmission characteristics, changes in alternative traffic contending for the same communication path, some combination or conjunction thereof, or otherwise.

The access point 120 might alter the transmission parameters for the A-MSDU packets 161, as they are constructed, in response to other communication traffic, such as the possibilities that more or fewer wireless stations 130 choose to be recipients of multicast messages 160, in response to bursty or other time-varying characteristics of the multicast messages 160.

The access point 120, or the control element 110, might consider whole-network optimization of sending multicast messages 160. This has the effect that individual A-MSDU packets 161, even between the same access point 120 and the same wireless device 130, under the same conditions, might have different transmission parameters. This might also have the effect that some multicast messages 160 are actually delivered in an inferior manner (for example, slower) so that other multicast messages 160 can be delivered in a superior manner (for example, with less bit-error rate).

ALTERNATIVE EMBODIMENTS

The invention has applicability and generality to other aspects of wireless communication. It is not limited to wireless communication based upon 802.11 standards, nor is it limited to any particular IEEE standard, to any particular communication standard, or even to wireless communication. One having skill in the art will recognize that the systems and methods disclosed herein may be effectuated using other techniques.

The invention claimed is:

1. A computer-implemented method, in an access point of a communication network, the method comprising the steps of:
   intermittently receiving a first set of multicast packets from a first sender and addressed to a first destination;
   intermittently receiving a second set of multicast packets from a second sender and addressed to the first destination;
   encapsulating in a first A-MSDU (aggregated media access control service data unit) packets for a first destination, at least a portion of both the first and second sets of multicast packets received from the first and second senders, wherein both the first and second sets of multicast packets are both destined to a station wirelessly connected to the access point;
   sending the first A-MSDU packets to the first destination through a unicast transmission; and
   receiving an ACK (acknowledgment) frame from the first destination for each of the first A-MSDU packets received.

2. The method of claim 1, wherein the first and second set of multicast packets are also addressed to a second destination, wherein the further comprises:
   encapsulating in one or more second A-MSDU packets for a second destination, at least a portion of both the first and second sets of multicast packet that differ in composition from the first one or more A-MSDU packets.

3. The method of claim 1, wherein a transmission parameter of the unicast transmission of the one or more first A-MSDU packets is altered by the access point relative to a transmission parameters of the first set of multicast packets.

4. The method of claim 1, wherein both the first and second sets of multicast packets are both received from a station wirelessly connected to the access point.

5. A non-transitory computer readable medium storing code that, when executed in an access point of a communication network, performs a method comprising the steps of:
   intermittently receiving a first set of multicast packets from a first sender and addressed to a first destination;
   intermittently receiving a second set of multicast packets from a second sender and addressed to the first destination;
   encapsulating in a first A-MSDU (aggregated media access control service data unit) packets for a first destination, at least a portion of both the first and second sets of multicast packets received from the first and second senders, wherein both the first and second sets of multicast packets are both destined to a station wirelessly connected to the access point;
   sending the first A-MSDU packets to the first destination through a unicast transmission; and receiving an ACK (acknowledgment) frame from the first destination for each of the first A-MSDU packets received.

6. The computer readable of claim 5, wherein the first and second set of multicast packets are also addressed to a second destination, wherein the further comprises:

encapsulating in one or more second A-MSDU packets for a second destination, at least a portion of both the first and second sets of multicast packet that differ in composition from the first one or more A-MSDU packets.

7. The method of claim 5, wherein a transmission parameter of the unicast transmission of the one or more first A-MSDU packets is altered by the access point relative to a transmission parameters of the first set of multicast packets.

8. The method of claim 5, wherein both the first and second sets of multicast packets are both received from a station wirelessly connected to the access point.

9. The method of claim 5, wherein both the first and second sets of multicast packets are both destined to a station wirelessly connected to the access point.

10. An access point of a communication network, comprising:

a processor; and
a memory device, storing:
a first module to intermittently receive a first set of multicast packets from a first sender and addressed to a first destination;
a second module to intermittently receive a second set of multicast packets from a second sender and addressed to the first destination;
a third module to encapsulate in a first A-MSDU (aggregated media access control service data unit) packets for a first destination, at least a portion of both the first and second sets of multicast packets received from the first and second senders, wherein both the first and second sets of multicast packets are both destined to a station wirelessly connected to the access point;
a fourth module to send the first A-MSDU packets to the first destination through a unicast transmission; and
a fifth module to receive an ACK (acknowledgment) frame from the first destination for each of the first A-MSDU packets received.

\* \* \* \* \*